United States Patent
Nam et al.

(10) Patent No.: US 12,114,291 B2
(45) Date of Patent: Oct. 8, 2024

(54) VIRTUAL RESOURCE BLOCK TO PHYSICAL RESOURCE BLOCK MAPPING IN NEW RADIO

(71) Applicant: QUALCOMM Incorporated, San Diego, CA (US)

(72) Inventors: Wooseok Nam, San Diego, CA (US); Tao Luo, San Diego, CA (US); Jing Sun, San Diego, CA (US); Alexandros Manolakos, San Diego, CA (US); Wanshi Chen, San Diego, CA (US); Heechoon Lee, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 16/184,771

(22) Filed: Nov. 8, 2018

(65) Prior Publication Data

US 2019/0150118 A1  May 16, 2019

Related U.S. Application Data

(60) Provisional application No. 62/584,501, filed on Nov. 10, 2017.

(51) Int. Cl.
*H04W 72/04* (2023.01)
*H04J 1/16* (2006.01)
(Continued)

(52) U.S. Cl.
CPC ........... *H04W 72/04* (2013.01); *H04L 1/0071* (2013.01); *H04L 5/0044* (2013.01);
(Continued)

(58) Field of Classification Search
CPC ..... H04L 1/0071; H04L 5/0044; H04L 67/10; H04L 5/0042; H04L 1/0057; H04W 76/27;
(Continued)

(56) References Cited

U.S. PATENT DOCUMENTS

| 8,493,835 B2 * | 7/2013 | Gaal | H04W 72/04 |
| | | | 370/344 |
| 2008/0162674 A1 * | 7/2008 | Dahiya | H04L 67/10 |
| | | | 709/221 |

(Continued)

FOREIGN PATENT DOCUMENTS

| CN | 101911745 A | 12/2010 |
| CN | 102893688 A | 1/2013 |

(Continued)

OTHER PUBLICATIONS

International Search Report and Written Opinion—PCT/US2018/060131—ISA/EPO—dated Mar. 29, 2019.
(Continued)

*Primary Examiner* — Marcus Smith
*Assistant Examiner* — Jason A Harley
(74) *Attorney, Agent, or Firm* — Patterson & Sheridan LLP

(57) ABSTRACT

Certain aspects of the present disclosure relate to methods and apparatus mapping virtual resource blocks (VRBs) to physical resource blocks (PRBs) and using the mapping in wireless communications, for example, in new radio (NR) technologies. An exemplary method includes determining a first interleaved mapping that maps a first interleaving unit of N consecutive first virtual resource blocks (VRBs) to N consecutive first physical resource blocks (PRBs), wherein each first PRB comprises a set of frequency resources during a period, transmitting a first grant allocating the first inter- (Continued)

leaving unit of first VRBs to a first user equipment (UE), and communicating with the first UE via the first PRBs mapped to the first VRBs of the first interleaving unit.

21 Claims, 15 Drawing Sheets

(51) Int. Cl.
| | |
|---|---|
| *H04L 1/00* | (2006.01) |
| *H04L 5/00* | (2006.01) |
| *H04W 8/00* | (2009.01) |
| *H04W 72/0446* | (2023.01) |
| *H04W 72/12* | (2023.01) |
| *H04W 76/27* | (2018.01) |
| *H04W 72/0453* | (2023.01) |
| *H04W 88/02* | (2009.01) |
| *H04W 88/08* | (2009.01) |

(52) U.S. Cl.
CPC ........... *H04L 5/0094* (2013.01); *H04W 76/27* (2018.02); *H04L 5/0007* (2013.01); *H04W 72/0453* (2013.01); *H04W 88/02* (2013.01); *H04W 88/08* (2013.01)

(58) Field of Classification Search
CPC ..... H04W 88/02; H04W 72/04; H04W 28/19; H04M 13/2778; H03M 13/2707
USPC .......................................................... 370/329
See application file for complete search history.

(56) References Cited

U.S. PATENT DOCUMENTS

| | | | | |
|---|---|---|---|---|
| 2009/0170522 A1* | 7/2009 | Tirkkonen | ............ | H04L 5/0092 455/452.1 |
| 2012/0014330 A1* | 1/2012 | Damnjanovic | ......... | H04L 5/003 370/329 |
| 2013/0034062 A1 | 2/2013 | Seo et al. | | |
| 2013/0039219 A1* | 2/2013 | Lee | ........................ | H04B 3/542 370/255 |
| 2013/0039291 A1* | 2/2013 | Blankenship | ......... | H04L 5/0037 370/329 |
| 2014/0219162 A1* | 8/2014 | Eyuboglu | ............. | H04W 16/26 370/315 |
| 2015/0063231 A1* | 3/2015 | Seo | ........................ | H04L 5/0044 370/329 |
| 2015/0146666 A1* | 5/2015 | Wu | ........................ | H04L 5/0053 370/329 |
| 2016/0014778 A1* | 1/2016 | Zhou | ..................... | H04W 24/06 370/252 |
| 2017/0142719 A1* | 5/2017 | Seo | ........................ | H04L 5/0028 |
| 2017/0155710 A1* | 6/2017 | Quinn | ..................... | H04L 67/10 |
| 2017/0223686 A1 | 8/2017 | You et al. | | |
| 2019/0151018 A1* | 5/2019 | Mayse | ............... | A61B 18/1815 |

FOREIGN PATENT DOCUMENTS

| | | |
|---|---|---|
| CN | 103891353 A | 6/2014 |
| CN | 104025685 A | 9/2014 |
| CN | 107005374 A | 8/2017 |
| JP | 2011504322 A | 2/2011 |
| JP | 2011519208 A | 6/2011 |
| JP | 2012239203 A | 12/2012 |
| WO | 2009120827 A1 | 10/2009 |

OTHER PUBLICATIONS

Qualcomm Incorporated: "DL/UL Resource Allocation," 3GPP Draft; R1-1718568_DL_UL_SCHEDULING, 3rd Generation Partnership Project (3GPP), Mobile Competence Centre; 650, Route Des Lucioles; F-06921 Sophia- Antipolis Cedex; France, vol. RAN WG1, No. Prague, Czech Republic; Oct. 9, 2017-Oct. 13, 2017, Oct. 8, 2017, XP051341749, 10 pages, Retrieved from the Internet: URL: http://www.3gpp.org/ftp/Meetings_3GPP_SYNC/RAN1/Docs/ [retrieved on Oct. 8, 2017].
Vivo: "Discussion on PRB Bundling for DL," 3GPP Draft; R1-1715615_Discussion on PRB Bundling for DL, 3rd Generation Partnership Project (3GPP), Mobile Competence Centre; 650, Route Des Lucioles; F-06921 Sophia-Antipolis Cedex; Frnace, vol. RAN WG1, No. Nagoya, Japan; Sep. 18, 2017-Sep. 21, 2017, Sep. 17, 2017, XP051339082, 6 pages, Retrieved from the Internet: URL: http://www.3gpp.org/ftp/Meetings_3GPP_SYNC/RAN1/Docs/ [retrieved on Sep. 17, 2017].
Qualcomm Incorporated: "Remaining Details on DL/UL Resource Allocation", 3GPP TSG-RAN WG1 Meeting #91, R1-1720687, Reno, USA, Nov. 27-Dec. 1, 2017, 8 Pages, Nov. 18, 2017.
Samsung: "DL/UL Resource Allocation", 3GPP TSG RAN WG1 Meeting 90bis, R1-1717662 Resource Allocation, 3rd Generation Partnership Project (3GPP), Mobile Competence Centre, 650, Route Des Lucioles, F-06921, Sophia-Antipolis Cedex, France, vol. Ran WG1. No. Prague, CZ, Oct. 9, 2017-Oct. 13, 2017, Oct. 8, 2017, Oct. 2, 2017, XP051340847, pp. 1-11, sections 3, 4.
Taiwan Search Report—TW107139835—TIPO—Jun. 30, 2022 (180665TW).
VIVO: "Discussion on PRB Bundling for DL", 3GPP TSG RAN WG1 Meeting #90, R1-1712833, Prague, P.R. Czech, Aug. 21-25, 2017, 6 Pages.
VIVO: "Discussion on PRB Bundling for DL", 3GPP TSG RAN WG1 Meeting #90bis, R1-1717469, Prague, CZ, Oct. 9-13, 2017, 6 Pages. Oct. 3, 2017.

\* cited by examiner

VIRTUAL RESOURCE BLOCK TO PHYSICAL RESOURCE BLOCK MAPPING IN NEW RADIO

CROSS-REFERENCE TO RELATED APPLICATIONS

The present application for patent claims benefit of and priority to U.S. Provisional Patent Application No. 62/584,501, filed Nov. 10, 2017, which is assigned to the assignee hereof and hereby expressly incorporated by reference herein in its entirety as if fully set forth below and for all applicable purposes.

TECHNICAL FIELD

The present disclosure relates generally to communication systems, and more particularly, to methods and apparatus for mapping virtual resource blocks (VRBs) to physical resource blocks (PRBs) and using the mapping in wireless communications, for example, in communications systems operating according to new radio (NR) technologies.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes determining a first interleaved mapping that maps a first interleaving unit of N consecutive first virtual resource blocks (VRBs) to N consecutive first physical resource blocks (PRBs), wherein each first PRB comprises a set of frequency resources during a period, transmitting a first grant allocating the first interleaving unit of first VRBs to a first user equipment (UE), and communicating with the first UE via the first PRBs mapped to the first VRBs of the first interleaving unit.

Certain aspects provide a method for wireless communication by a user equipment (UE). The method generally includes determining an interleaved mapping that maps an interleaving unit of N consecutive virtual resource blocks (VRBs) to N consecutive physical resource blocks (PRBs), wherein each PRB comprises a set of frequency resources during a period, receiving a grant allocating the interleaving unit of VRBs from a base station (BS), and communicating with the BS via the PRBs mapped to the VRBs of the interleaving unit.

Certain aspects provide an apparatus for wireless communication. The apparatus generally includes a processor configured to determine a first interleaved mapping that maps a first interleaving unit of N consecutive first virtual resource blocks (VRBs) to N consecutive first physical resource blocks (PRBs), wherein each first PRB comprises a set of frequency resources during a period, to transmit a first grant allocating the first interleaving unit of first VRBs to a first user equipment (UE), and to communicate with the first UE via the first PRBs mapped to the first VRBs of the first interleaving unit, and a memory coupled the processor.

Certain aspects provide an apparatus for wireless communication. The apparatus generally includes a processor configured to determine an interleaved mapping that maps an interleaving unit of N consecutive virtual resource blocks (VRBs) to N consecutive physical resource blocks (PRBs), wherein each PRB comprises a set of frequency resources during a period, to receive a grant allocating the interleaving unit of VRBs from a base station (BS), and to communicate with the BS via the PRBs mapped to the VRBs of the interleaving unit, and a memory coupled with the processor.

Certain aspects provide an apparatus for wireless communication. The apparatus generally includes means for determining a first interleaved mapping that maps a first interleaving unit of N consecutive first virtual resource blocks (VRBs) to N consecutive first physical resource blocks (PRBs), wherein each first PRB comprises a set of frequency resources during a period, means for transmitting a first grant allocating the first interleaving unit of first VRBs to a first user equipment (UE), and means for communicating with the first UE via the first PRBs mapped to the first VRBs of the first interleaving unit.

Certain aspects provide an apparatus for wireless communication. The apparatus generally includes means for determining an interleaved mapping that maps an interleaving unit of N consecutive virtual resource blocks (VRBs) to N consecutive physical resource blocks (PRBs), wherein each PRB comprises a set of frequency resources during a period, means for receiving a grant allocating the interleaving unit of VRBs from a base station (BS), and means for communicating with the BS via the PRBs mapped to the VRBs of the interleaving unit.

Certain aspects provide a computer-readable medium for wireless communication. The computer-readable medium includes instructions that, when executed by a processing system, cause the processing system to perform operations generally including determining a first interleaved mapping that maps a first interleaving unit of N consecutive first virtual resource blocks (VRBs) to N consecutive first physical resource blocks (PRBs), wherein each first PRB comprises a set of frequency resources during a period, transmitting a first grant allocating the first interleaving unit of first VRBs to a first user equipment (UE), and communicating with the first UE via the first PRBs mapped to the first VRBs of the first interleaving unit.

Certain aspects provide a computer-readable medium for wireless communication. The computer-readable medium includes instructions that, when executed by a processing system, cause the processing system to perform operations generally including determining an interleaved mapping that maps an interleaving unit of N consecutive virtual resource blocks (VRBs) to N consecutive physical resource blocks (PRBs), wherein each PRB comprises a set of frequency resources during a period, receiving a grant allocating the interleaving unit of VRBs from a base station (BS), and communicating with the BS via the PRBs mapped to the VRBs of the interleaving unit.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
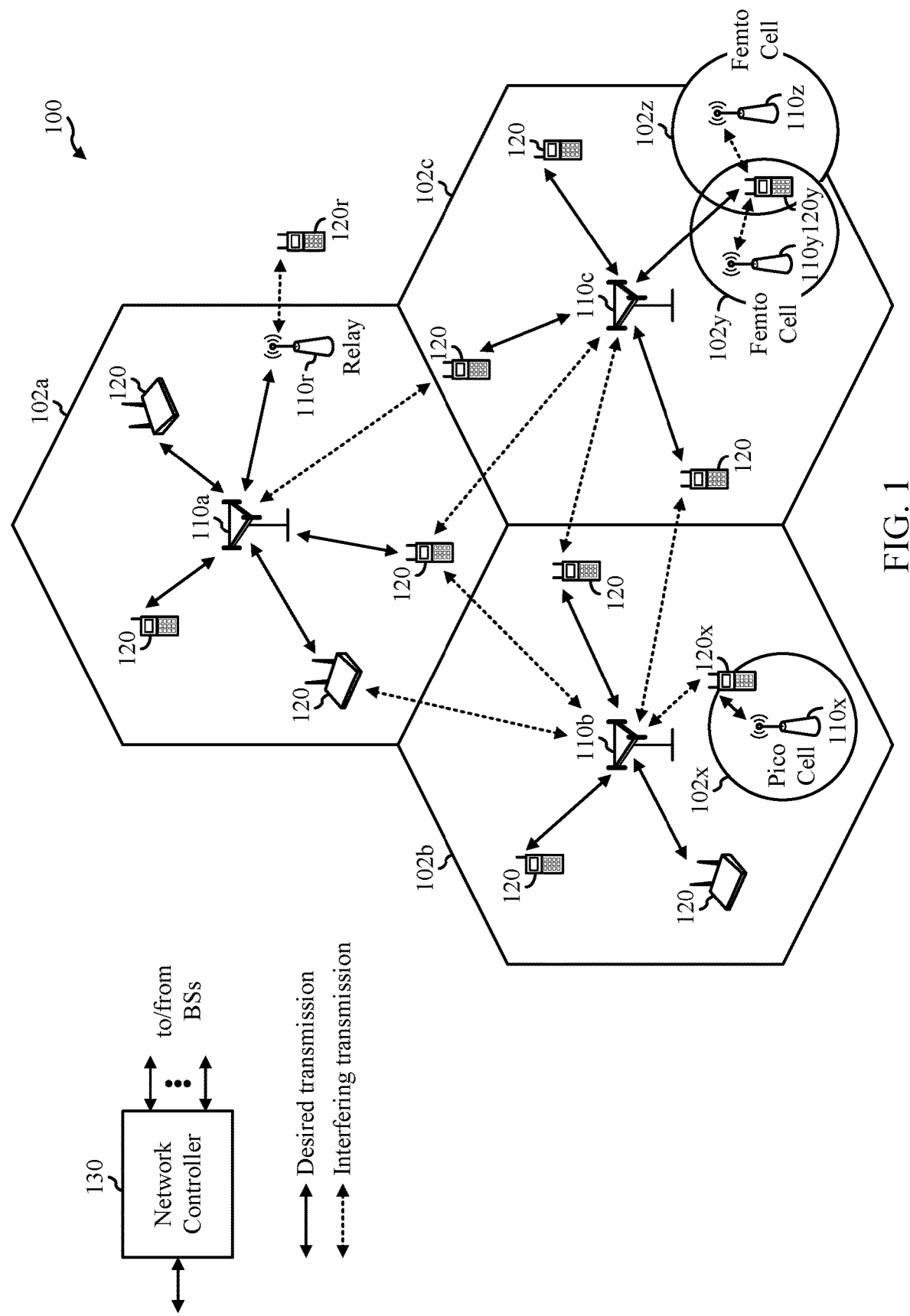
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (new radio access technology or 5$^{th}$ Generation (5G) technology).

NR may support various wireless communication services, such as Enhanced mobile broadband (eMBB) services targeting wide bandwidth (e.g. 80 MHz and wider) communications, millimeter wave (mmW) services targeting high carrier frequency (e.g. 27 GHz and higher) communications, massive machine-type communications (mMTC) services targeting non-backward compatible machine-type communications (MTC) techniques, and/or mission critical services targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

In previously known techniques (e.g., LTE), two types of virtual resource blocks (VRBs) are supported: (1) localized VRBs (e.g., resource allocation types 0 and 1), in which there is a direct mapping from each VRB to a corresponding PRB; and (2) distributed VRBs ((e.g., resource allocation type 2), in which consecutive VRBs may not be mapped to PRBs that are consecutive in the frequency domain. Distributed VRBs can be used when channel dependent scheduling is not suitable and high frequency diversity is required, for example with low-rate services (e.g., voice) and high mobility, high modulation order, high rank multiple-input multiple-output (MIMO) communications.

According to aspects of the present disclosure, techniques are provided for using distributed VRBs in NR communications systems. The provided techniques are similar to distributed VRBs in LTE and can be used for NR data channels using a cyclic prefix orthogonal frequency division multiplexing (CP-OFDM) waveform for various physical channels, such as physical downlink shared channels (PDSCHs) and physical uplink shared channels (PUSCHs). The provided techniques account for NR-specific channelization parameters, bandwidth part (BWP), PRB-grid parameters, and PRB bundling parameters. In addition, the provided techniques may resolve collisions between data transmissions and NR-specific resources, such as synchronization signal blocks (SS-blocks) and resources reserved for forward and backward-compatibility.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and evolved Node B (eNB), Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by user equipments (UEs) with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
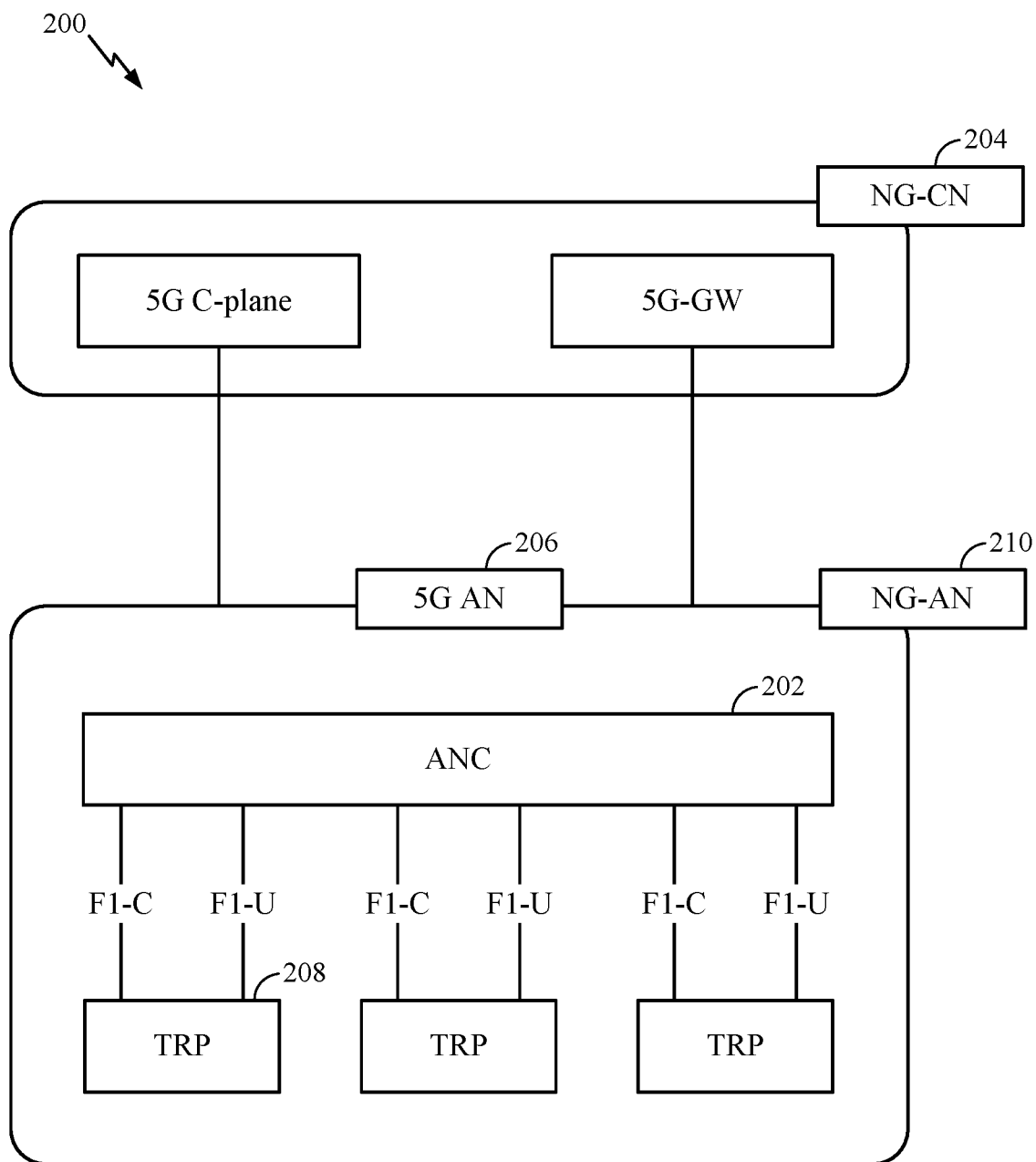
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
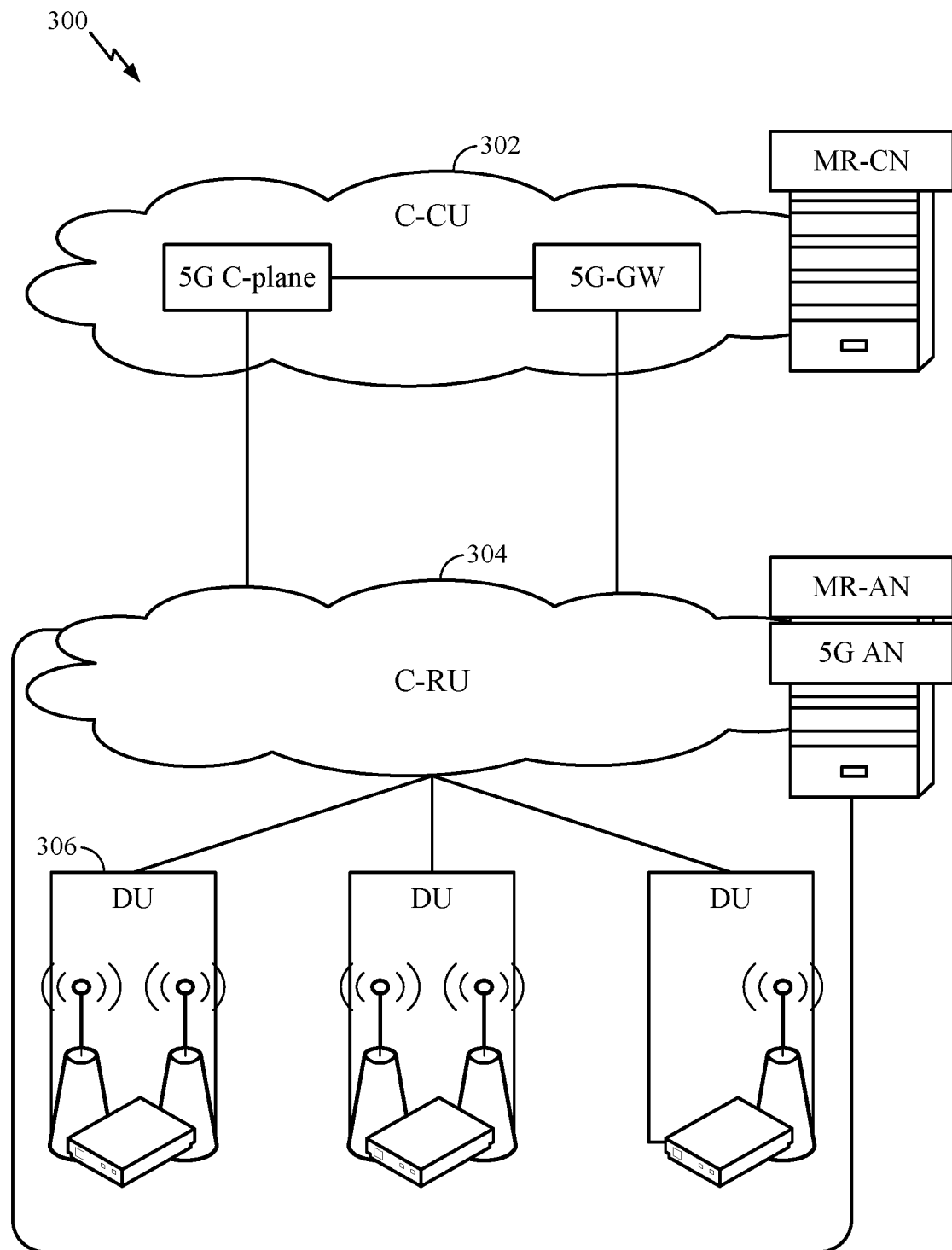
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
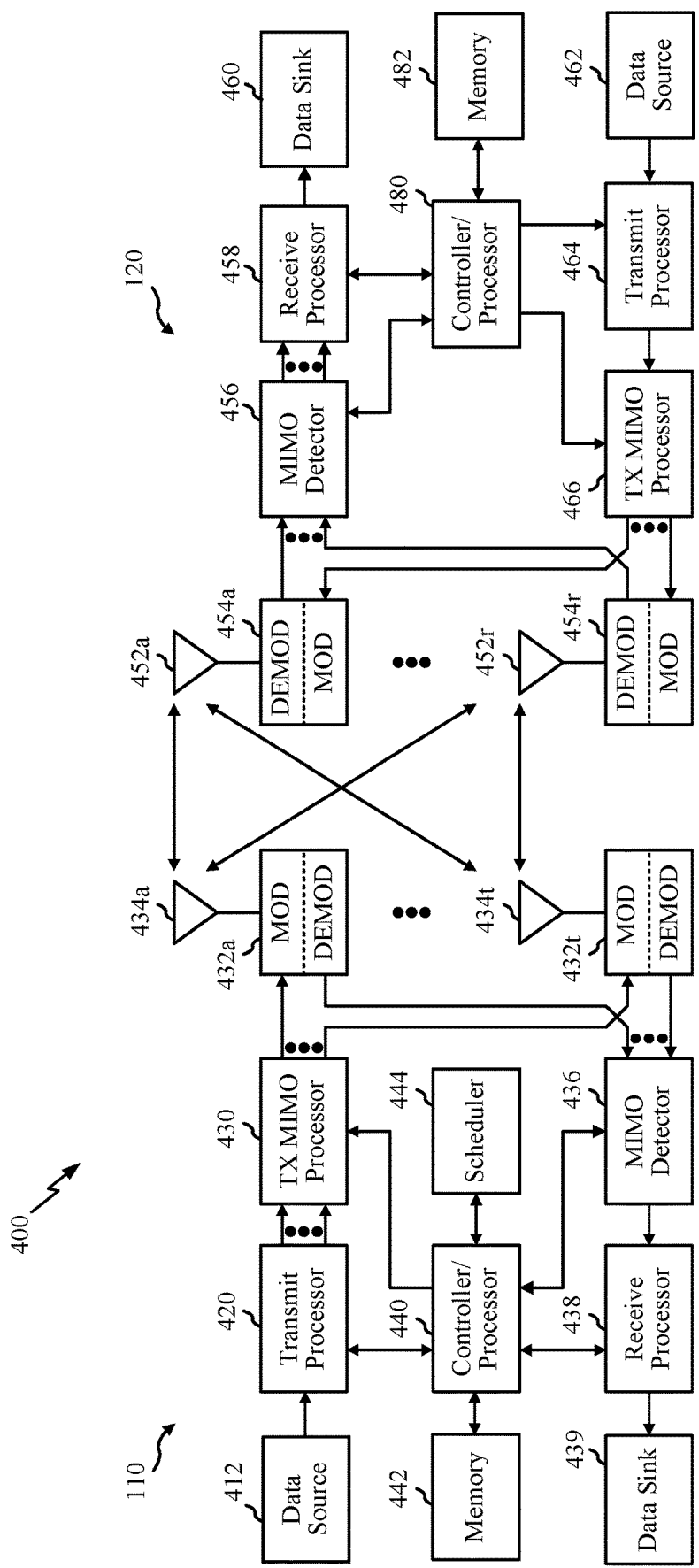
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 10 and 11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
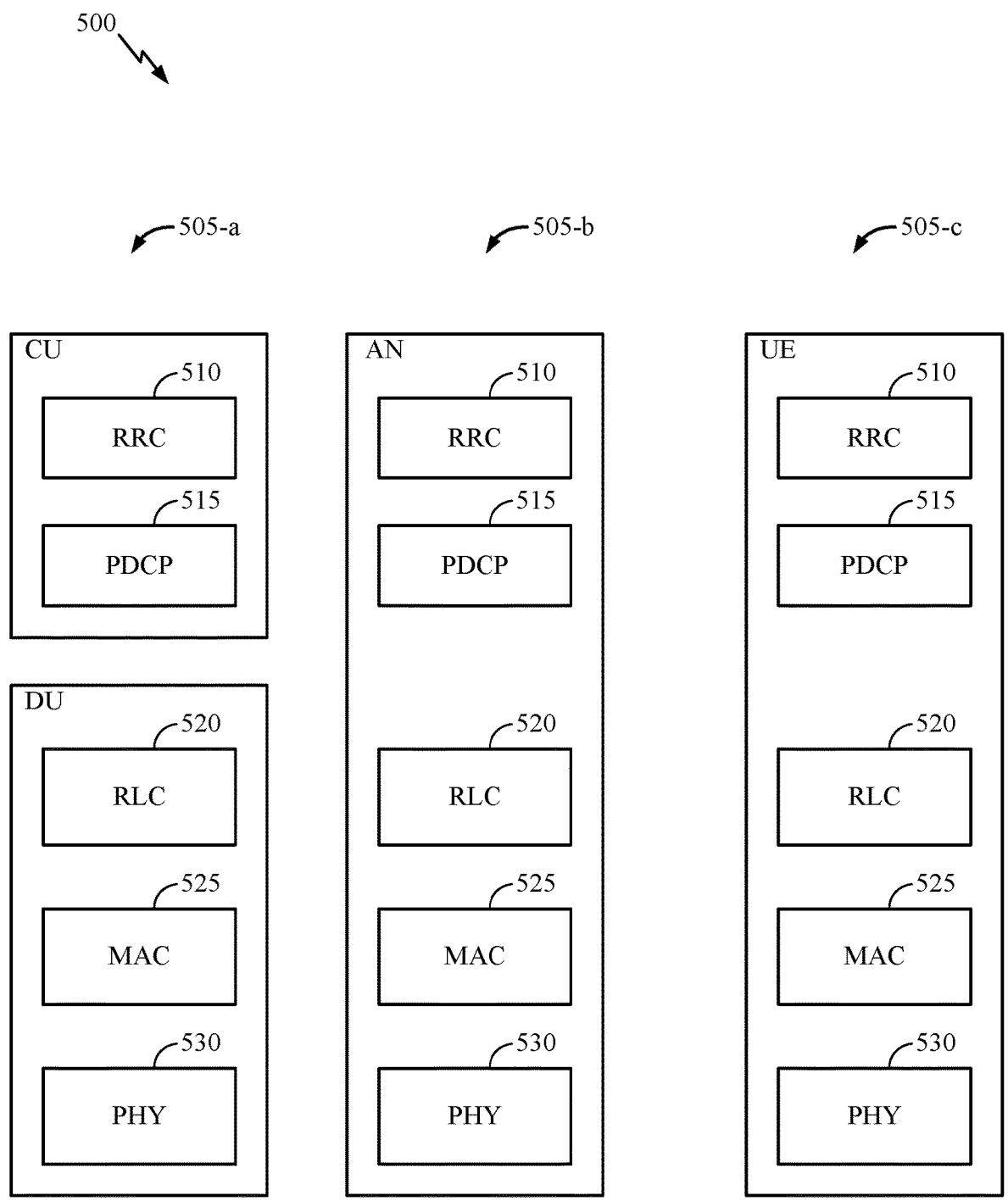
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack 505-c (e.g., the RRC layer 510, the PDCP layer 515, the RLC layer 520, the MAC layer 525, and the PHY layer 530).

Figure 6:
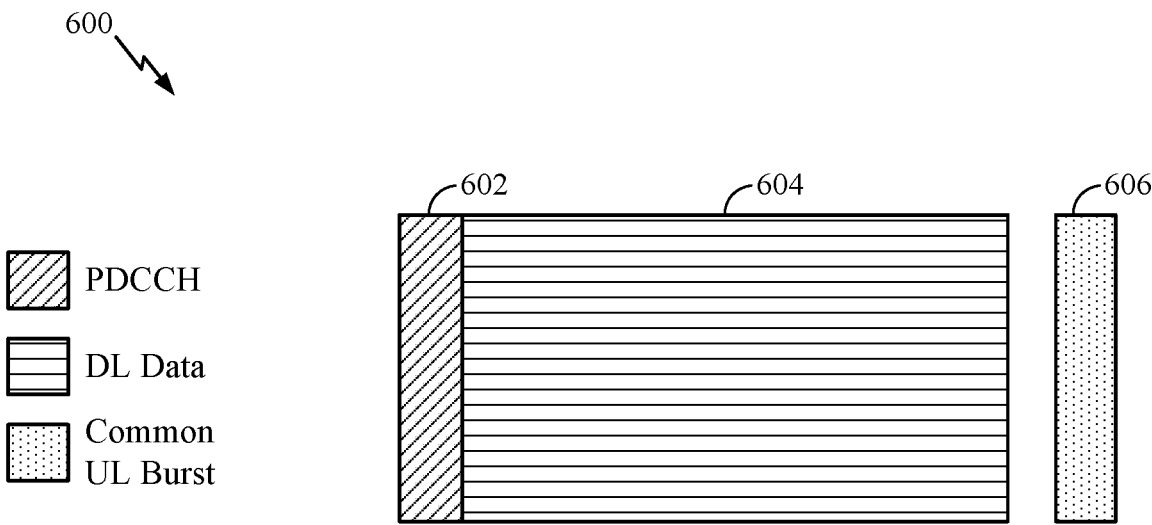
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
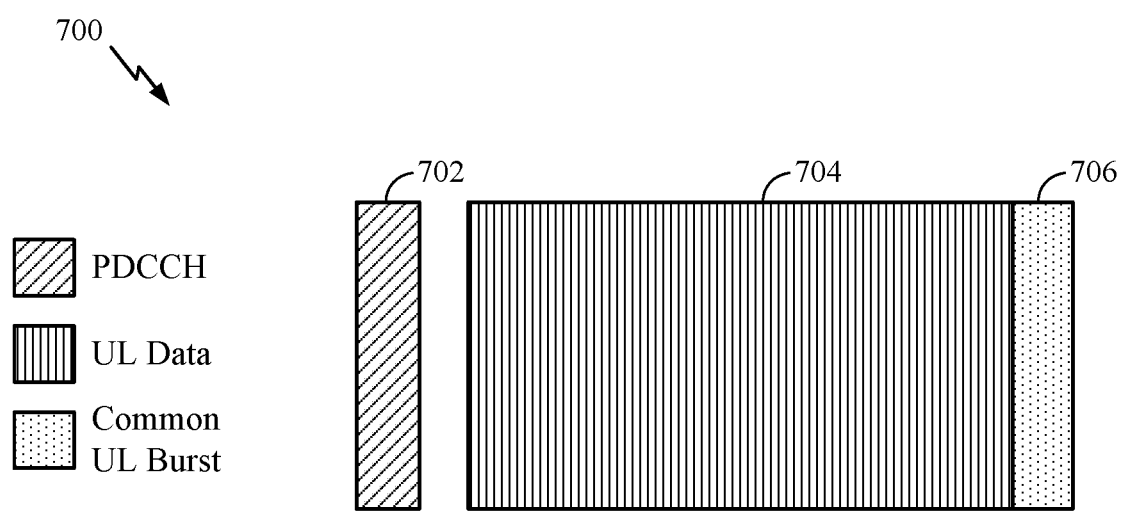
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In accordance with one or more aspects of embodiments disclosed herein, various designs are provided for short burst channels (e.g., PUCCH and PUSCH), that allow for multiplexing various signals.

Example Virtual Resource Block to Physical Resource Block Mapping

According to aspects of the present disclosure, techniques are provided for using distributed VRBs in NR communications systems. The provided techniques are similar to distributed VRBs in LTE and can be used for NR data channels using a cyclic prefix orthogonal frequency division multiplexing (CP-OFDM) waveform for various physical channels, such as physical downlink shared channels (PDSCHs) and physical uplink shared channels (PUSCHs). The provided techniques account for NR-specific channelization parameters, bandwidth part (BWP), PRB-grid parameters, and PRB bundling parameters. In addition, the provided techniques may resolve collisions between data transmissions and NR-specific resources, such as synchronization signal blocks (SS-blocks) and resources reserved for forward and backward-compatibility.

In aspects of the present disclosure, techniques of mapping VRBs to PRBs based on interleaving are provided. In provided techniques, a one-to-one mapping from VRBs to PRBs is determined by an interleaver. An interleaver may perform interleaving based on an interleaving unit of N RBs (e.g., a VRB bundle). The interleaver may map a group of N consecutive VRBs (e.g., a VRB bundle) to a group of N consecutive PRBs (e.g., a PRB bundle). In performing interleaving, a VRB unit (e.g., a VRB bundle) having index i is mapped to a PRB unit (e.g., a PRB bundle) having index Π(i), where Π(i) is a function describing the one-to-one mapping of VRBs to PRBs.

According to aspects of the present disclosure, an interleaver and its interleaving unit may be specific to a device and/or a bandwidth part (BWP). That is, an interleaver and its interleaving unit may be used for resource allocations (e.g., in downlink control information (DCI)) to a single device, and other devices operating in the same bandwidth may use a different interleaver and interleaving unit. Similarly, an interleaver and its interleaving unit may be used for resource allocations to devices operating on a BWP, while the allocating device (e.g., a BS) uses a different interleaver and interleaving unit for other BWPs.

In aspects of the present disclosure, higher layer signaling (e.g., RRC signaling) or DCI signaling may be used to configure or re-configure a UE (e.g., by a serving cell) with information regarding the mapping of VRBs to PRBs, at least in a semi-static manner.

As used herein, "interleaver" is not confined to a specific type of interleaver, and may refer to any type of interleaver that can be used, such as row-column interleavers, random interleavers, polynomial-based interleavers, etc.

Figure 8:
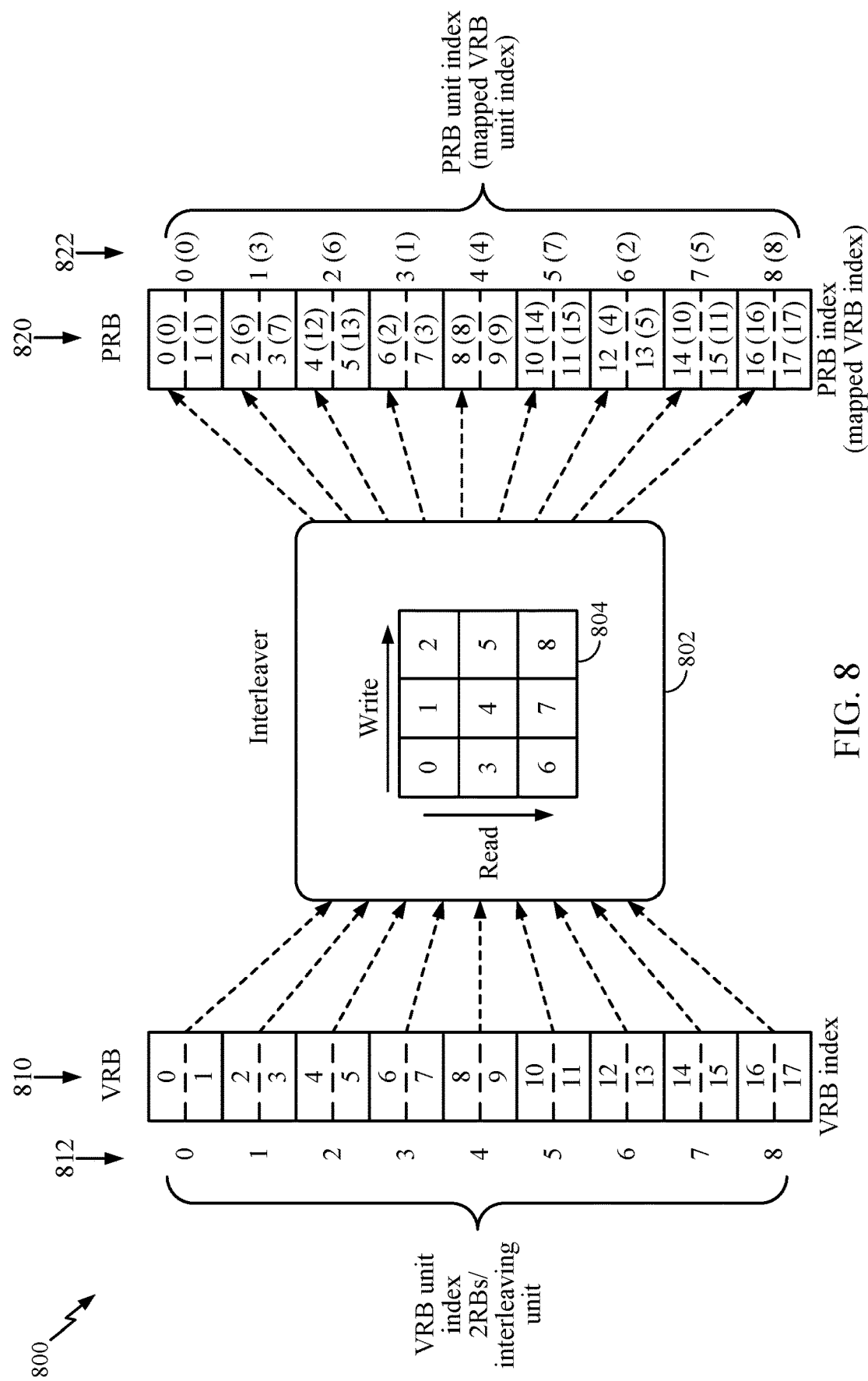
FIG. 8 illustrates an example interleaving technique, in accordance with aspects of the present disclosure.

FIG. 8 illustrates an example row-column interleaving technique 800, in accordance with aspects of the present disclosure. In the exemplary technique a mapping based on a row-column interleaver 802 is shown. In the exemplary technique, an interleaving unit size N=2 is shown. That is, in the exemplary mapping, two contiguous VRBs form an interleaving unit that is mapped to two contiguous PRBs. As illustrated, a group of VRBs 810 are organized in interleaving units with indices 812. Similarly, a group of PRBs 820 are organized in units with indices 822. In the exemplary interleaver, allocations assigned to the VRBs are first written in a row-wise manner to a rectangular matrix 804. That is, an allocation of interleaving unit 0 is written to block 0 of the matrix, an allocation of interleaving unit 1 is written to block 1 of the matrix, and so on. The interleaver then reads from the matrix in a column-wise manner to determine the allocations of the PRBs. That is, an allocation in block 0 of the matrix is assigned to the PRBs in the unit with index 0, while the allocation in block 3 of the matrix is assigned to the PRBs in the unit with index 1, the allocation in block 6 of the matrix is assigned to the PRBs in the unit with index 2, and so on. The indices 822 illustrate the mapping of the units with the PRB unit indices shown above the corresponding VRB interleaving unit indices, which are in parentheses. Similarly, the indices 820 show the mapping of the VRBs to the corresponding PRBs, with the PRB indices shown next to the corresponding VRB indices, which are in parentheses. By use of the illustrated technique, a contiguous RB allocation in VRBs results in a distributed RB allocation in PRBs, while causing each two (N=2) consecutive VRBs to be mapped to two consecutive PRBs.

According to aspects of the present disclosure, there may be a relationship between the disclosed interleaving techniques and PRB bundling. In disclosed techniques, a bundle of K consecutive PRBs may define a unit of MIMO precoding and demodulation reference signal (DMRS)-based channel estimation. PRB bundling may be based on an absolute PRB-grid of a component carrier, according to previously known techniques. Because PRB bundling size may define a unit of precoding and DMRS channel estimation, it is desirable for RBs in a PRB bundle (PRG) to be contiguous in both a VRB domain and a PRB domain.

In aspects of the present disclosure, a single interleaving unit may contain multiple PRGs. An interleaving unit size is an integer multiple of a PRG size, that is, N=α·K, where α is an integer greater than 0 and K is a number of PRBs in a PRG.

According to aspects of the present disclosure, boundaries of interleaving units and PRGs are aligned. That is, a boundary between two adjacent interleaving units in the PRB domain coincides with a boundary between two PRGs to which the two interleaving units are mapped.

In aspects of the present disclosure, interleaving units on edges of a frequency band may have fewer than N RBs. This may occur, for example, when boundaries of a BWP are not aligned with boundaries of the grid of PRGs.

According to aspects of the present disclosure, a single or multiple values of the multiplication factor α discussed above may be semi-statically configured by RRC signaling, or combined with DCI signaling for a dynamic indication of one of the configured values when multiple values are configured.

In aspects of the present disclosure, wideband precoding may be used, in which the same precoding is applied for an entire BWP. In this case, any values of N less than or equal to the bandwidth (BW) of the BWP can be used. Table 1 below illustrates some exemplary PRG sizes and corresponding interleaving unit sizes.

TABLE 1

| Candidate PRG size | Interleaving unit size, N |
|---|---|
| 2 | 2α |
| 4 | 4α |
| Wideband (BW of BWP) | N (≤BW of BWP) |

According to aspects of the present disclosure, when PRG size is equal to the bandwidth (BW) of a BWP (i.e., as shown in the final row of Table 1, above), then a same MIMO precoding matrix is used for all RBs in that BWP. In such a case, the interleaving unit size, N, may be any integral number of PRBs that is less than or equal to the BWP bandwidth, as mapping PRBs to VRBs without regard to PRGs (i.e., mapping PRBs to VRBs without keeping all PRBs of a PRG mapped to consecutive VRBs) will not degrade channel estimation performance, because of the use of the same MIMO precoding matrix in all PRBs.

Figure 9:
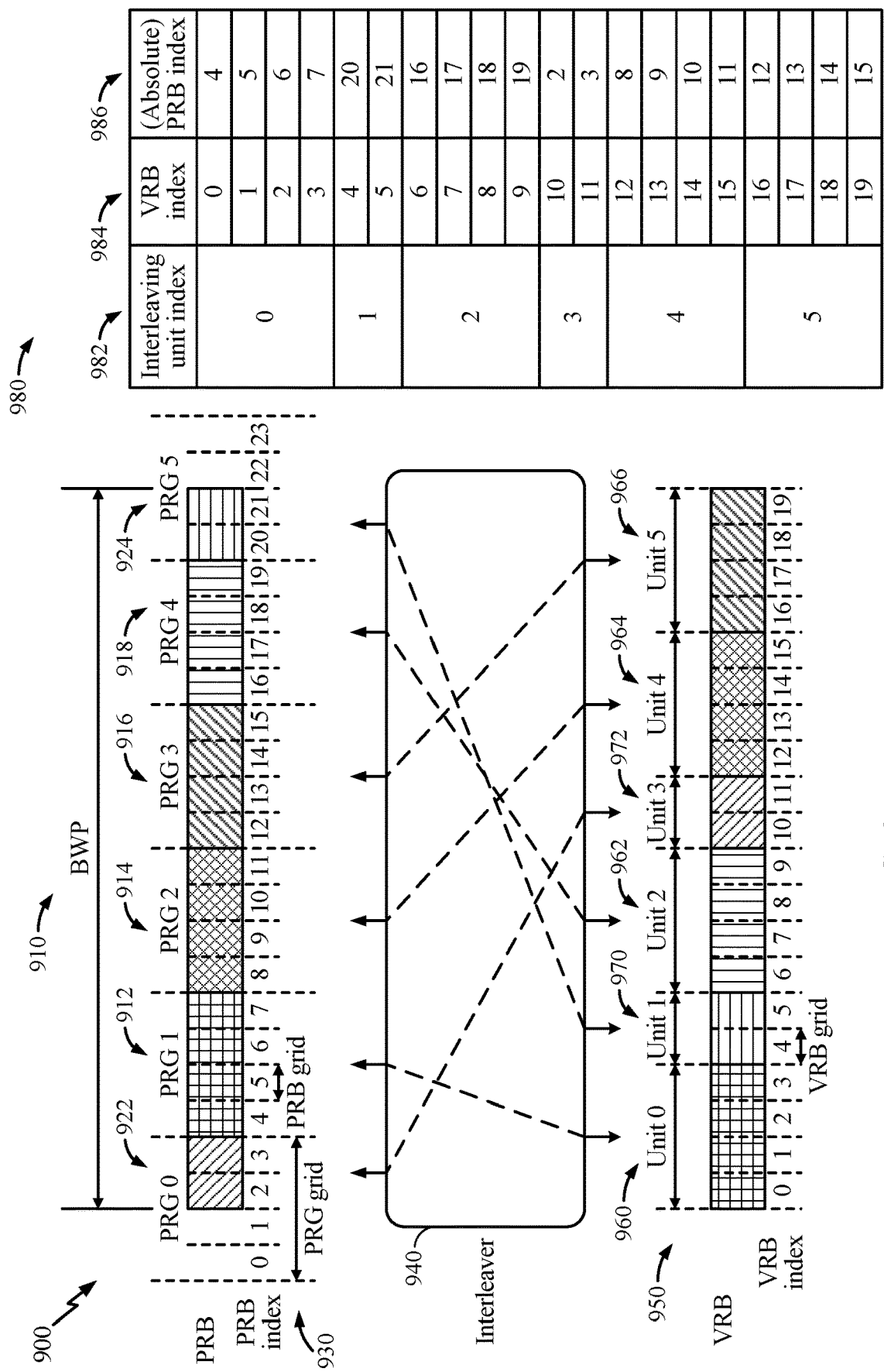
FIG. 9 illustrates an exemplary mapping of PRBs to VRBs, in accordance with aspects of the present disclosure.

FIG. 9 illustrates an exemplary mapping 900 of a BWP of 20 PRBs to VRBs, using N=4, K=4, and α=1, in accordance with aspects of the present disclosure. In the exemplary mapping, the boundaries of the BWP 910 do not coincide with PRG grid 930. Hence, the PRGs include four PRGs, 912, 914, 916, and 918, that each have four PRBs, and two PRGs, 922 and 924, that each have two PRBs. The interleaver 940 maps the 20 PRBs of the BWP 910 to 20 VRBs 950. The VRBs are organized into four interleaving units, 960, 962, 964, and 966, that each have four VRBs and two interleaver units, 970 and 972, that each have two VRBs. Since α=1 in this example, the interleaver 940 maps each PRG to a corresponding interleaving unit having the same size in RBs (PRBs for the PRGs, VRBs for the interleaving units). Thus, the interleaver maps VRBs to PRBs such that each PRG of contiguous PRBs is mapped to an interleaving unit having a same number of contiguous VRBs. The chart at 980 illustrates the correspondence between the interleaving unit indices 982, the VRB indices 984, and the PRB indices 986.

Figure 10:
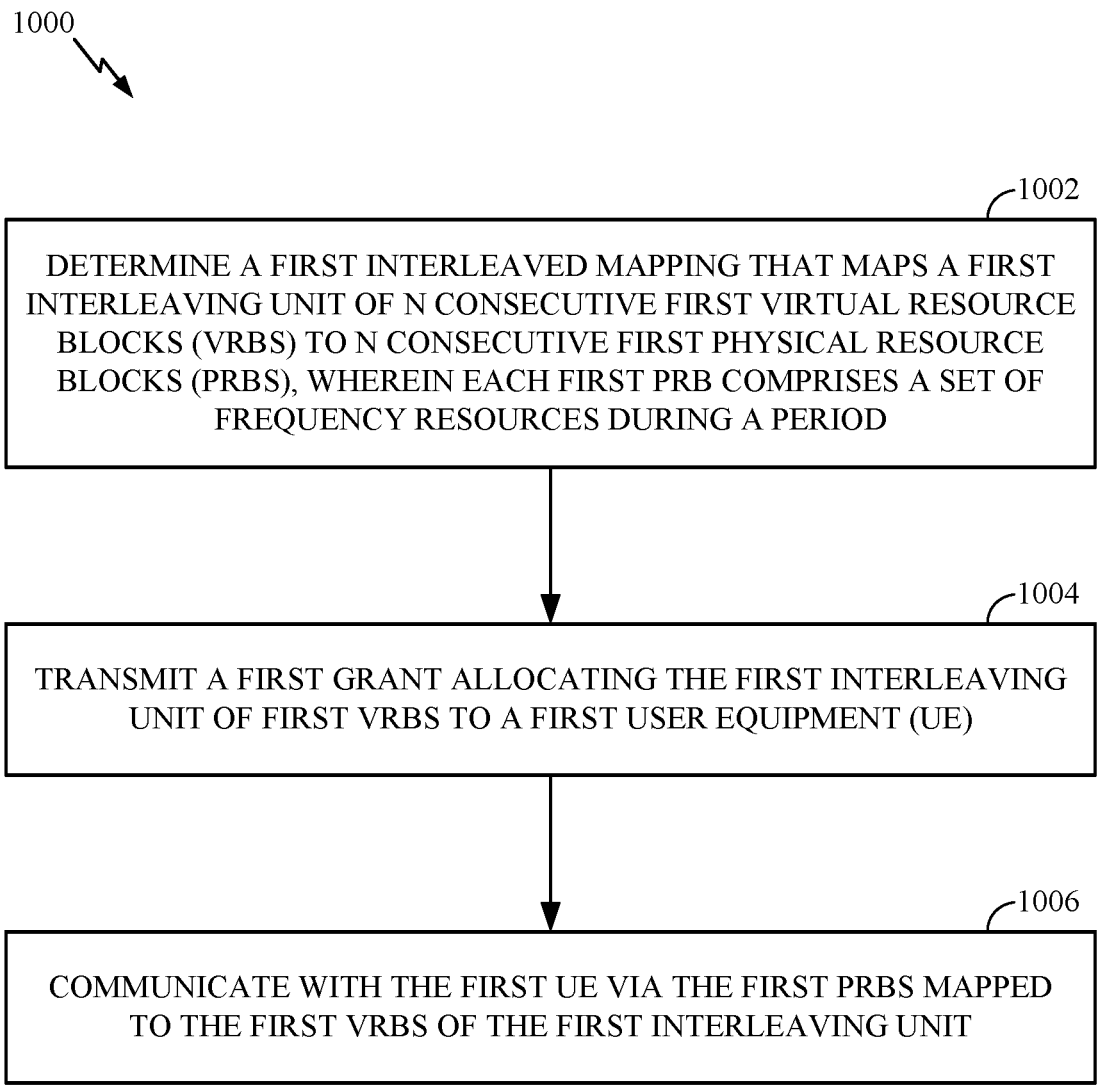
FIG. 10 illustrates exemplary operations 1000 for wireless communications that may be performed by a base station, in accordance with aspects of the present disclosure.

FIG. 10 illustrates exemplary operations 1000 for wireless communications that may be performed by a base station, such as base stations 110 in FIGS. 1 and 4, 5G access node 206 in FIG. 2, and C-RU 304 shown in FIG. 3, according to aspects of the present disclosure.

Operations 1000 begin at block 1002 with the base station determining a first interleaved mapping that maps a first interleaving unit of N consecutive first virtual resource blocks (VRBs) to N consecutive first physical resource blocks (PRBs), wherein each first PRB comprises a set of frequency resources during a period. For example, BS 110a, shown in FIG. 1, determines a first interleaved mapping (e.g., the mapping illustrated between the VRBs 950 and the PRBs of the BWP 910 shown in FIG. 9) that maps a first interleaving unit of four consecutive first VRBs (e.g., unit 960, shown in FIG. 9) to four consecutive first PRBs (e.g., unit 912, shown in FIG. 9), wherein each first PRB comprises a set of frequency resources (e.g., the frequencies of PRBs 4, 5, 6, and 7) during a period (e.g., a slot or a subframe).

At block 1004, operations 1000 continue with the base station transmitting a first grant allocating the first interleaving unit of first VRBs to a first user equipment (UE). Continuing the example from above, BS 110a transmits a first grant (e.g., in a DCI) allocating (e.g., for a PDSCH) the first interleaving unit of first VRBs (from block 1002) to UE 120 (shown in FIG. 1).

Operations 1000 continue at block 1006 with the base station communicating with the first UE via the first PRBs mapped to the first VRBs of the first interleaving unit. Continuing the example from above, BS 110a communicates with UE 120 by transmitting a PDSCH to UE 120 via the first PRBs mapped to the first VRBs of the first interleaving unit.

Figure 11:
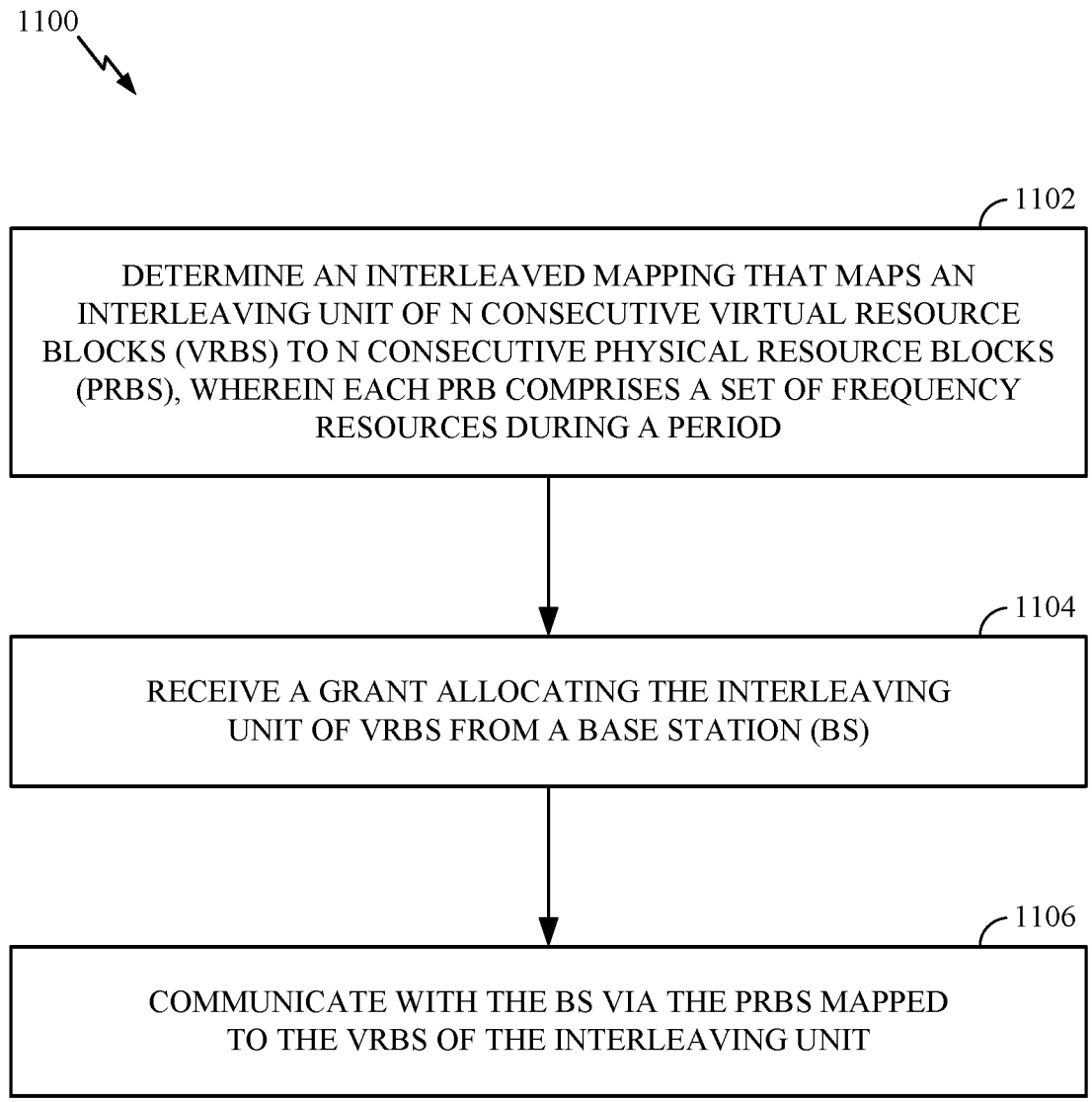
FIG. 11 illustrates exemplary operations for wireless communications that may be performed by a user equipment (UE), in accordance with aspects of the present disclosure.

FIG. 11 illustrates exemplary operations 1100 for wireless communications that may be performed by a user equipment (UE), such UEs 120 shown in FIGS. 1 and 4, according to aspects of the present disclosure. Operations 1100 may be considered complementary to operations 1000, described above with reference to FIG. 10.

Operations 1100 begin at block 1102 with the UE determining an interleaved mapping that maps an interleaving unit of N consecutive virtual resource blocks (VRBs) to N consecutive physical resource blocks (PRBs), wherein each PRB comprises a set of frequency resources during a period. For example, UE 120 (shown in FIG. 1) determines an interleaved mapping (e.g., the mapping illustrated between the VRBs 950 and the PRBs of the BWP 910 shown in FIG. 9) that maps an interleaving unit of four consecutive VRBs (e.g., unit 960, shown in FIG. 9) to four consecutive PRBs (e.g., unit 912, shown in FIG. 9), wherein each PRB comprises a set of frequency resources (e.g., the frequencies of PRBs 4, 5, 6, and 7) during a period (e.g., a slot or a subframe).

At block 1104, operations 1100 continue with the UE receiving a grant allocating the interleaving unit of VRBs from a base station (BS). Continuing the example from above, UE 120 receives a grant (e.g., in a DCI) allocating (e.g., for a PDSCH) the interleaving unit of VRBs (from block 1102) from BS 110a (shown in FIG. 1).

Operations 1100 continue at block 1106 with the UE communicating with the BS via the PRBs mapped to the VRBs of the interleaving unit. Continuing the example from above, UE 120 communicates with BS 110a by receiving a PDSCH from BS 110a via the PRBs mapped to the VRBs of the interleaving unit.

According to aspects of the present disclosure, communicating with a UE, as described above with reference to block 1006 in FIG. 10, may include transmitting a signal (e.g., a PDSCH) to the UE or receiving a signal (e.g., a PUSCH) from the UE.

In aspects of the present disclosure, communicating with a BS, as described above with reference to block 1106 in FIG. 11, may include transmitting a signal (e.g., a PUSCH) to the BS or receiving a signal (e.g., a PDSCH) from the BS.

According to aspects of the present disclosure, interleaving units may have non-uniform sizes, e.g., units on band edges of a BWP may be different sizes from other units, as illustrated in FIG. 9.

In aspects of the present disclosure, having non-uniform sizes of PRGs may cause problems for some UEs. For example, as illustrated in FIG. 9, two PRGs, 922 and 924, have two PRBs, while the other PRGs, 912, 914, 916, and 918, have four PRBs. Therefore, due to the smaller PRG size, an allocation in PRG 922 or 924, or an allocation in unit 970 or 972 may have lower precoding and channel estimation performance.

According to aspects of the present disclosure, a BWP-specific PRG grid may be used for a BWP, in order to reduce problems related to some PRGs having smaller sizes than the other PRGs. When a large set of UEs share the same BWP, a new PRG grid can be configured only for that BWP. The BWP-specific PRG grid can be configured to avoid partial units at edges of the BWP, and therefore may not be aligned with the carrier-specific absolute PRG grid. If configured, the BWP-specific PRG grid may be assumed to be aligned with the BWP boundaries, or an offset value (in RBs) relative to BWP boundaries or an absolute PRG grid can be configured.

In aspects of the present disclosure, a grant (e.g., the first grant mentioned in block 1004 above or the grant mentioned in block 1104 above) may allocate a plurality of the interleaving units (e.g., for a PDSCH from a UE).

Figure 12:
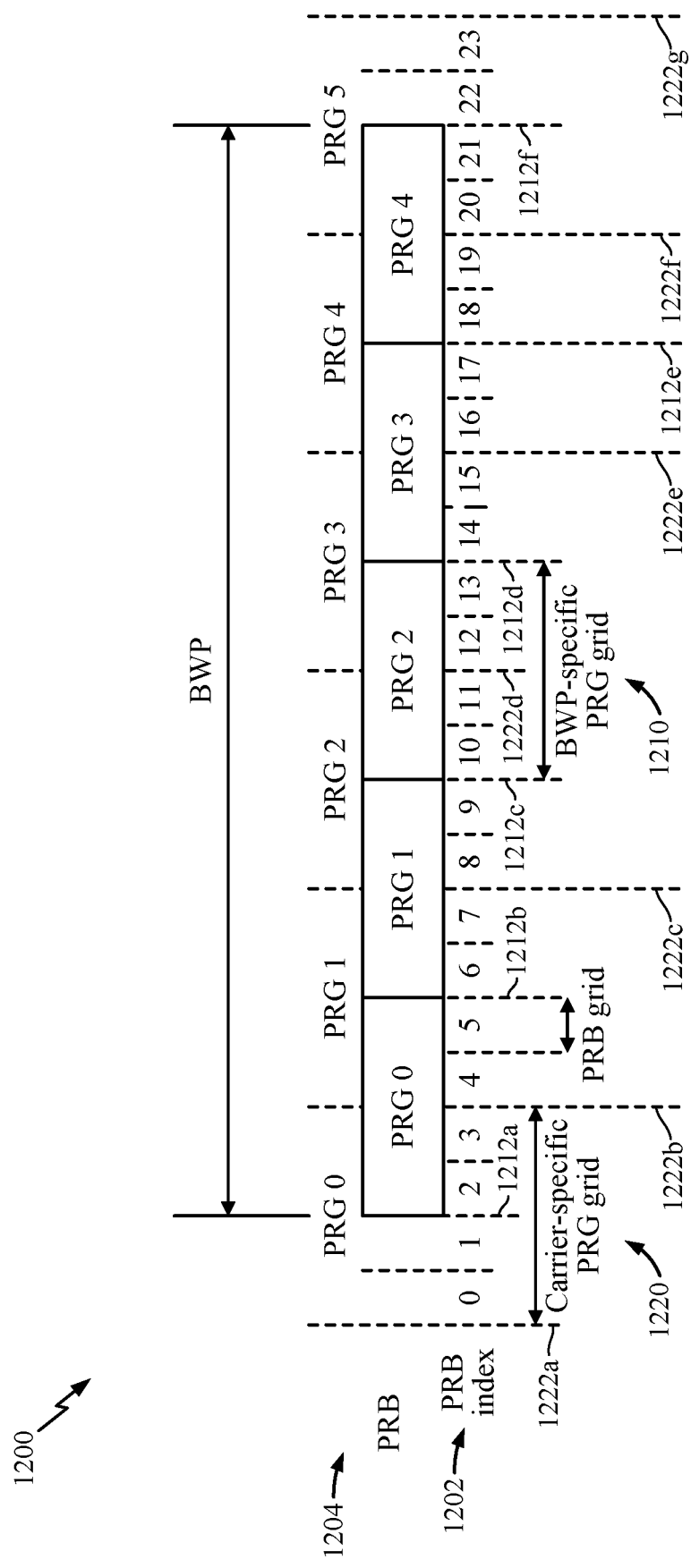
FIG. 12 illustrates an exemplary bandwidth part (BWP), in accordance with aspects of the present disclosure.

FIG. 12 illustrates an exemplary BWP 1200 in which a BWP-specific PRG grid is configured, in accordance with aspects of the present disclosure. Carrier-specific indices to PRBs in the bandwidth of the carrier are shown at 1202. Carrier-specific indices to PRGs in the bandwidth of the carrier are shown at 1204. The exemplary BWP consists of the twenty PRBs from the PRB with index 2 to the PRB with index 21, inclusive. In the exemplary BWP, boundaries 1212 of the BWP-specific PRG grid are shown, and the PRG with index 2 of the BWP-specific PRG grid is illustrated at 1210. As mentioned above, a carrier-specific PRG grid with boundaries 1222 is overlaid over the bandwidth of the BWP. A PRG with index 0 of the carrier-specific grid is shown at 1220.

According to aspects of the present disclosure, a null-RB assignment may be used for a BWP, in order to reduce problems related to some PRGs having smaller sizes than the other PRGs. Null-RBs, which may be UE-specific, can be semi-statically configured for the partial (i.e., size <N) interleaving units (e.g., units 970 and 972 in FIG. 9) to avoid data resource mapping. The semi-statically configured null-RBs are then excluded from allocations to avoid the problem of an inconsistency between the precoding grid and the interleaving units.

Figure 13A:
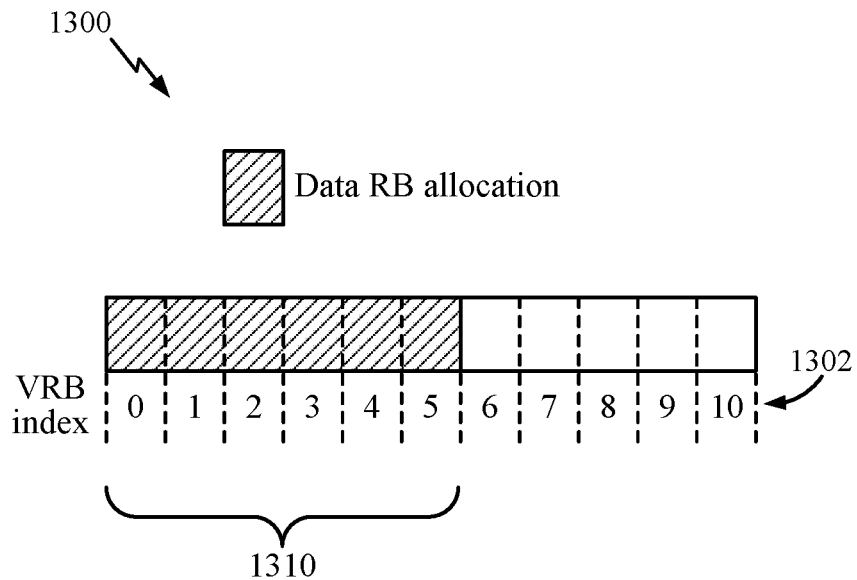
FIGS. 13A and 13B illustrate exemplary VRB allocations, in accordance with aspects of the present disclosure.
Figure 13B:
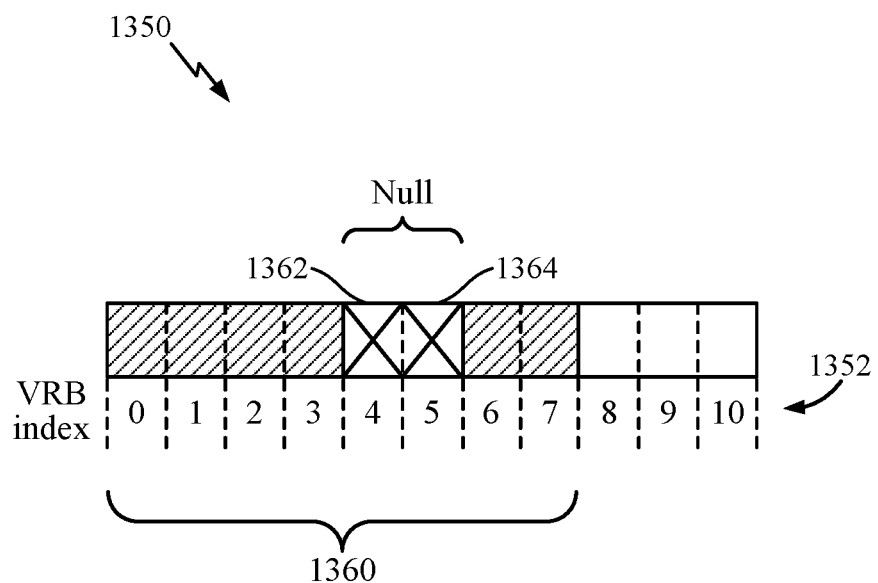

FIGS. 13A and 13B illustrate exemplary sets of VRBs 1300 and 1350 of BWPs, in accordance with aspects of the present disclosure. Each of the exemplary sets of VRBs includes a contiguous 6 RB allocation, starting from RB #0. Indices of the VRBs in the first set of VRBs are shown at 1302. Indices of the VRBs in the second set of VRBs are shown at 1352. The first exemplary allocation 1310 is in the set of VRBs 1300 of a BWP that does not use null-RBs, and thus the allocation 1310 includes VRBs with indices 0 through 5. The second exemplary allocation 1360 is in the set of VRBs 1350 of a BWP that uses two null-RBs, in the VRBs 1362 and 1364, with indices 4 and 5. Thus, the allocation 1360 of 6 RBs includes VRBs with indices 0 through 3 and indices 6-7.

According to aspects of the present disclosure, a combination of using a BWP-specific PRG grid, as described above with reference to FIG. 12, and using null-RBs, as described above with reference to FIG. 13B, may be used in some communications systems.

In aspects of the present disclosure, for operations involving small RB allocations, the diversity gain of RB allocations smaller than the size of an interleaving unit (e.g., VoIP traffic) may be impacted, because RBs may not be spread wide enough in frequency after interleaving.

According to aspects of the present disclosure, some RBs in some interleaving units can be reserved for small RB allocation. Traffic using small RB allocations can be assigned on the reserved RBs, while other traffic can be assigned on the rest of the RBs. Null-RB configuration, as described above with reference to FIG. 13B, can be used to accomplish the reservation. That is, null-RBs can be configured for UEs with large RB allocation to reserve some RBs for UEs with small RB allocations. Because UEs with configured null-RBs do not allocate in the null-RB locations, other UEs without null-RB configuration can freely use the location for the traffic using the small RB allocations.

Figure 14A:
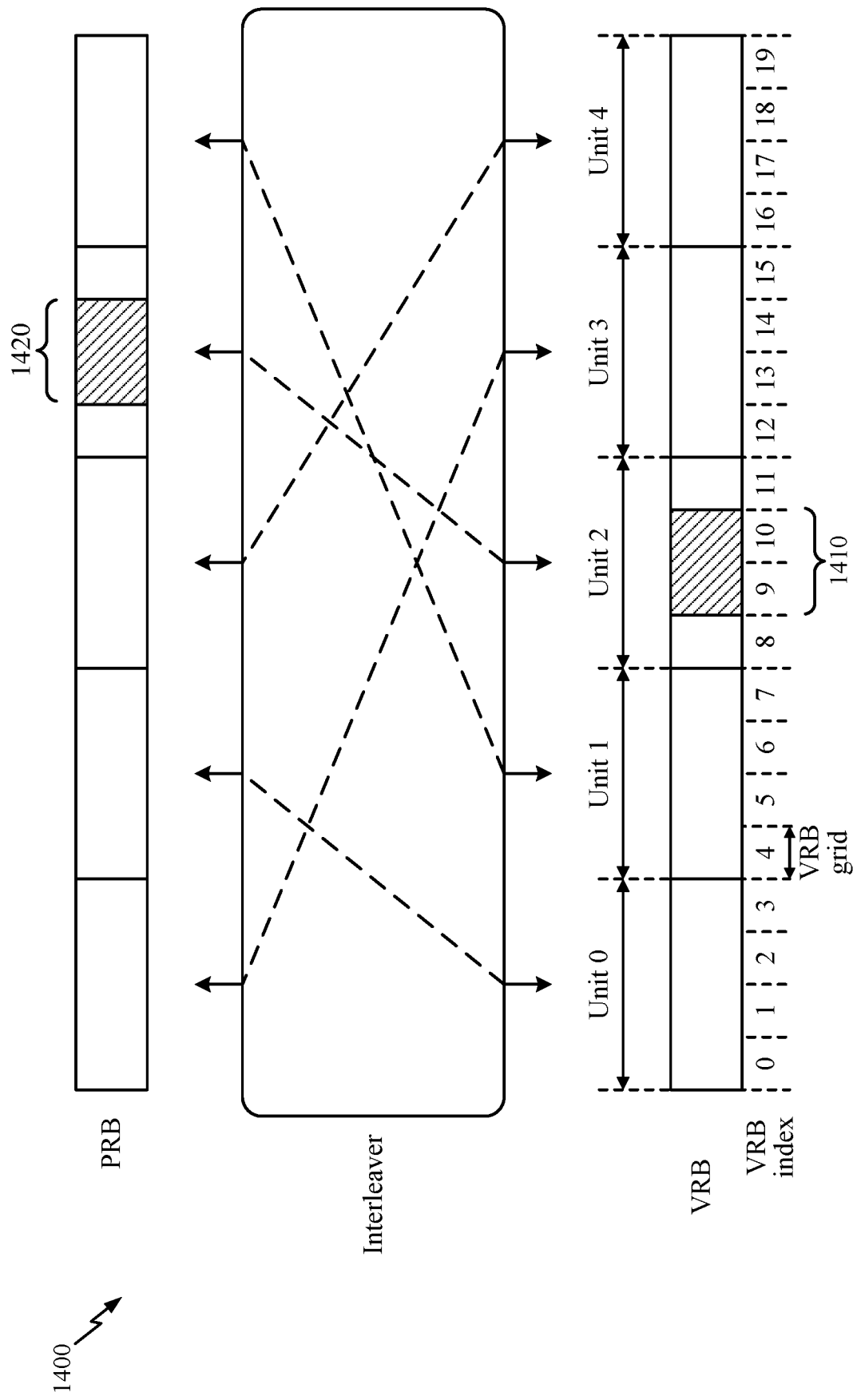
FIGS. 14A and 14B illustrate exemplary interleaving mappings, in accordance with aspects of the present disclosure.
Figure 14B:
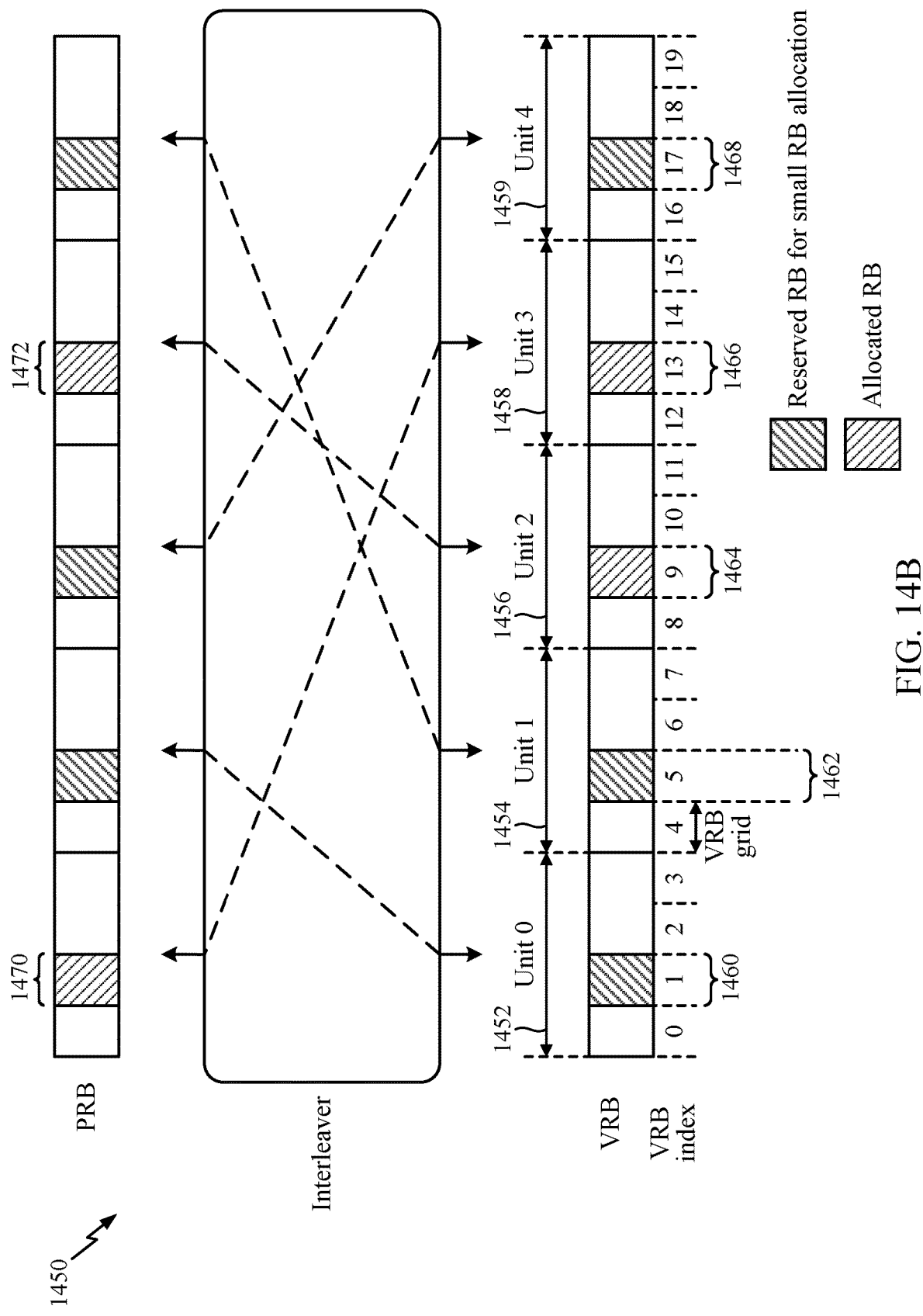

FIGS. 14A and 14B illustrate exemplary interleaving mappings 1400 and 1450, in accordance with aspects of the present disclosure. In the exemplary mapping 1400, two VRBs at 1410 are assigned for use by traffic using small RB allocations. When the two VRBs are allocated for small RB allocation traffic, the traffic does not benefit from frequency diversity, because the VRBs are mapped to consecutive PRBs, as shown at 1420. In the exemplary mapping 1450, five VRBs, 1460, 1462, 1464, 1466, and 1468, (e.g., one in each interleaving unit 1452, 1454, 1456, 1458, and 1459) are reserved for small RB allocation traffic. In the exemplary mapping, two reserved RBs, 1464, and 1466, are allocated to small RB traffic. The VRBs allocated to the small RB allocation traffic are mapped to the PRBs 1470 and 1472, which have significantly larger frequency diversity than the PRBs at 1420, shown in FIG. 14A.

According to aspects of the present disclosure, some resources in PRBs may be reserved for some other purposes, e.g., synchronization signals or forward compatibility resources. The reservation(s) can be implemented at the RB-symbol level or at the limited resource element (RE) level (RE-level). The reserved resources may be semi-statically and/or dynamically indicated to UEs for rate matching. Since data resources (i.e., resources for PDSCH or PUSCH) are allocated in VRBs, the reserved resources in PRBs should be translated (e.g., de-interleaved) to VRBs for rate matching.

In aspects of the present disclosure, a rate mapping procedure may be as follows: 1) determine reserved resources (RB-symbol level or limited RE-level) in PRBs in a given slot; 2) translate the reserved resource location (e.g., RB, RE, or symbol) in the PRBs to VRBs through de-interleaving via a de-interleaver function, $\Pi^{-1}$; 3) allocate data resources (e.g., for PDSCH and/or PUSCH) in VRBs using a contiguous RB allocation based on starting and/or ending VRB indices or a starting RB and a length of an allocation, while avoiding reserved resources while assigning data (e.g., rate matching); and 4) perform interleaving for VRB-to-PRB mapping.

Figure 15:
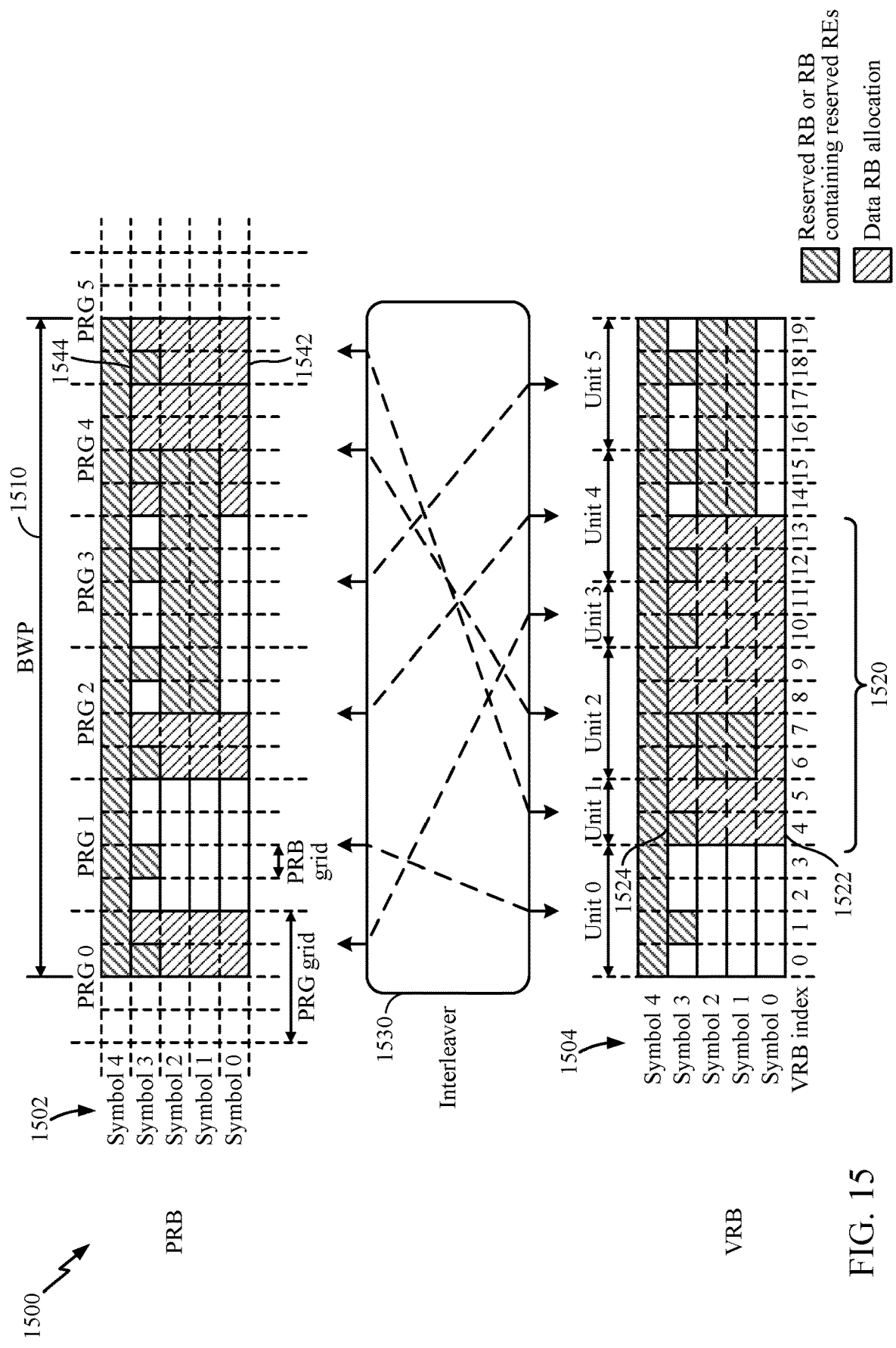
FIG. 15 illustrates an exemplary interleaving mapping, in accordance with aspects of the present disclosure.

FIG. 15 illustrates an exemplary interleaving mapping 1500, in accordance with aspects of the present disclosure. The exemplary interleaving mapping utilizes a 5-symbol slot and is configured for a bandwidth of 20 RBs in the BWP 1510. Indices for the symbols in the PRB domain are shown at 1502, while indices for the symbols in the VRB domain are shown at 1504. An allocation 1520 of contiguous VRBs starting at the RB having index 4 and having an allocation length of 10 (i.e., VRB 4 through VRB 13, inclusive) is shown. Locations of reserved resources in VRB and PRB are related by the interleaving/de-interleaving function 1530. The exemplary mapping shows RBs allocated for data transmission, such as the VRB 1522, and RBs that are reserved or contain reserved REs, such as the PRB 1544. In the exemplary mapping, the data VRB 1522 corresponds to the PRB 1542. Similarly, the PRB 1544 that is reserved or contains reserved REs corresponds to the VRB 1524. Because the VRB 1524 corresponds to a PRB that is reserved or contains reserved REs, the VRB 1524 is rate-matched around.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a base station (BS), comprising:
   determining a first interleaved mapping that maps a first interleaving unit of N consecutive first virtual resource blocks (VRBs) to N consecutive first physical resource blocks (PRBs), wherein N is greater than one, wherein each first PRB comprises a plurality of resource elements, wherein the first interleaved mapping maps each interleaving unit of a plurality of interleaving units to a corresponding PRB bundle of a plurality of PRB bundles, wherein each PRB bundle of the plurality of PRB bundles has N PRBs, and wherein indices of the N consecutive first VRBs are different from indices of the N consecutive first PRBs;
   transmitting a first grant allocating the first interleaving unit of N consecutive first VRBs to a first user equipment (UE), wherein the first grant allocates the plurality of the interleaving units; and
   communicating with the first UE via the N consecutive first PRBs mapped to the N consecutive first VRBs of the first interleaving unit.

2. The method of claim 1, further comprising:
   transmitting an indication of the first interleaved mapping to the UE.

3. The method of claim 2, wherein transmitting the indication comprises:
   sending a first radio resource control (RRC) configuration comprising the indication of the first interleaved mapping to the UE.

4. The method of claim 3, further comprising:
   sending a second RRC configuration indicating a change of the first interleaved mapping to the UE.

5. The method of claim 1, wherein the first interleaved mapping is specific to a first bandwidth part (BWP), and the method further comprises:
   determining a second interleaved mapping specific to the first BWP that maps a second interleaving unit of M consecutive second VRBs to M consecutive second PRBs, wherein M is greater than 1;
   transmitting a second grant allocating the second interleaving unit of M consecutive second VRBs to a second UE; and
   communicating with the second UE via the M consecutive second PRBs mapped to the M consecutive second VRBs of the second interleaving unit.

6. The method of claim 5, wherein M is not equal to N.

7. The method of claim 1, wherein each PRB bundle includes the N consecutive first PRBs and upper and lower boundaries of the PRB bundle differ from boundaries of PRB bundles of a carrier-specific PRB bundle grid.

8. The method of claim 1, further comprising semi-statically configuring VRBs of one or more of the first interleaving units as null-RBs.

9. The method of claim 1, further comprising:
   reserving one or more PRBs for small RB allocations; and
   designating at least one interleaving unit corresponding to the reserved PRBs as null-RBs.

10. The method of claim 1, wherein one or more frequency resources are reserved and communicating with the first UE comprises:
    determining reserved portions of the N consecutive first VRBs corresponding to the reserved frequency resources;
    rate-matching data to the N consecutive first VRBs excluding the reserved portions; and
    transmitting the data via the N consecutive first PRBs.

11. The method of claim 1, wherein one or more frequency resources are reserved and communicating with the first UE comprises:
    signaling an indication of the reserved frequency resources to the UE.

12. A method for wireless communications performed by a user equipment (UE), comprising:
    determining an interleaved mapping that maps an interleaving unit of N consecutive virtual resource blocks (VRBs) to N consecutive physical resource blocks (PRBs), wherein N is greater than one, wherein each PRB comprises a plurality of resource elements, wherein the interleaved mapping maps each interleaving unit of a plurality of interleaving units to a corresponding PRB bundle of a plurality of PRB bundles, wherein each PRB bundle of the plurality of PRB bundles has N PRBs, and wherein indices of the N consecutive VRBs are different from indices of the N consecutive PRBs;

receiving a grant allocating the interleaving unit of N consecutive VRBs from a base station (BS), wherein the grant allocates the plurality of the interleaving units; and communicating with the BS via the N consecutive PRBs mapped to the N consecutive VRBs of the interleaving unit.

13. The method of claim 12, further comprising:

receiving an indication of the interleaved mapping from the BS.

14. The method of claim 13, wherein receiving the indication comprises:

receiving a first radio resource control (RRC) configuration comprising the indication of the interleaved mapping from the BS.

15. The method of claim 14, further comprising:

receiving a second RRC configuration indicating a change of the interleaved mapping from the BS.

16. The method of claim 12, wherein each PRB bundle includes the N consecutive PRBs and upper and lower boundaries of the PRB bundle differ from boundaries of PRB bundle of a carrier-specific PRB bundle grid.

17. The method of claim 12, further comprising receiving a semi-static configuration indicating VRBs of one or more of the interleaving units as null-RBs.

18. The method of claim 12, further comprising:

receiving an indication designating one or more PRBs as null-RBs;

receiving a small RB allocation of one or more of the null-RBs; and communicating with the BS according to the small RB allocation.

19. The method of claim 12, wherein communicating with the BS comprises:

receiving an indication that one or more frequency resources are reserved frequency resources;

determining reserved portions of the VRBs corresponding to the reserved frequency resources;

rate-matching data to the VRBs excluding the reserved portions; and transmitting the data via the PRBs.

20. An apparatus for wireless communications, comprising:

a processor configured to:

determine an interleaved mapping that maps an interleaving unit of N consecutive virtual resource blocks (VRBs) to N consecutive physical resource blocks (PRBs), wherein N is greater than one, wherein each PRB comprises a plurality of resource elements, wherein the interleaved mapping maps each interleaving unit of a plurality of interleaving units to a corresponding PRB bundle of a plurality of PRB bundles, wherein each PRB bundle of the plurality of PRB bundles has N PRBs, and wherein indices of the N consecutive VRBs are different from indices of the N consecutive PRBs;

transmit a grant allocating the interleaving unit of N consecutive VRBs to a user equipment (UE), wherein the grant allocates the plurality of the interleaving units; and communicate with the UE via the N consecutive PRBs mapped to the N consecutive VRBs of the interleaving unit; and a memory coupled with the processor.

21. An apparatus for wireless communications, comprising:

a processor configured to:

determine an interleaved mapping that maps an interleaving unit of N consecutive virtual resource blocks (VRBs) to N consecutive physical resource blocks (PRBs), wherein N is greater than one, wherein each PRB comprises a plurality of resource elements, wherein the interleaved mapping maps each interleaving unit of a plurality of interleaving units to a corresponding PRB bundle of a plurality of PRB bundles, wherein each PRB bundle of the plurality of PRB bundles has N PRBs, and wherein indices of the N consecutive VRBs are different from indices of the N consecutive PRBs;

receive a grant allocating the interleaving unit of N consecutive VRBs from a base station (BS), wherein the grant allocates the plurality of the interleaving units; and communicate with the BS via the N consecutive PRBs mapped to the N consecutive VRBs of the interleaving unit; and a memory coupled with the processor.

* * * * *